United States Patent [19]

Evans et al.

[11] 4,249,382
[45] Feb. 10, 1981

[54] EXHAUST GAS RECIRCULATION SYSTEM FOR TURBO CHARGED ENGINES

[75] Inventors: Duane E. Evans; William L. Brown, Jr., both of Peoria; Roger W. Johnson, Chillicothe, all of Ill.

[73] Assignee: Caterpillar Tractor Co., Peoria, Ill.

[21] Appl. No.: 908,414

[22] Filed: May 22, 1978

Related U.S. Application Data

[63] Continuation-in-part of Ser. No. 747,272, Dec. 3, 1976, abandoned.

[51] Int. Cl.³ .................... F02B 37/00; F02M 25/00
[52] U.S. Cl. ........................... 60/605; 123/571
[58] Field of Search ............... 60/39.52, 599, 600, 60/601, 602, 603, 605, 606; 123/119 A

[56] References Cited

U.S. PATENT DOCUMENTS 3,776,207  12/1973  Simko .................. 123/119 A
3,925,989  12/1975  Pustelnik ............... 123/119 A X Primary Examiner—Michael Koczo
Attorney, Agent, or Firm—Phillips, Moore, Weissenberger, Lempio & Majestic

[57] ABSTRACT

An improved turbocharged engine system comprising a piston engine with an inlet manifold, an exhaust manifold, a turbine driven by exhaust gases for transporting a portion of the exhaust gas energy to drive a compressor between a gas intake and the inlet manifold. There is used as the exhaust manifold a first exhaust manifold receiving exhaust gases only from a first set of pistons and a second exhaust manifold receiving exhaust gases only from a second set of pistons. The turbine comprises a first turbine driven by first exhaust manifold exhaust gases. The compressor comprises a first compressor driven by the first turbine. A portion of the exhaust gases from the second exhaust manifold are recycled to the inlet manifold.

4 Claims, 5 Drawing Figures

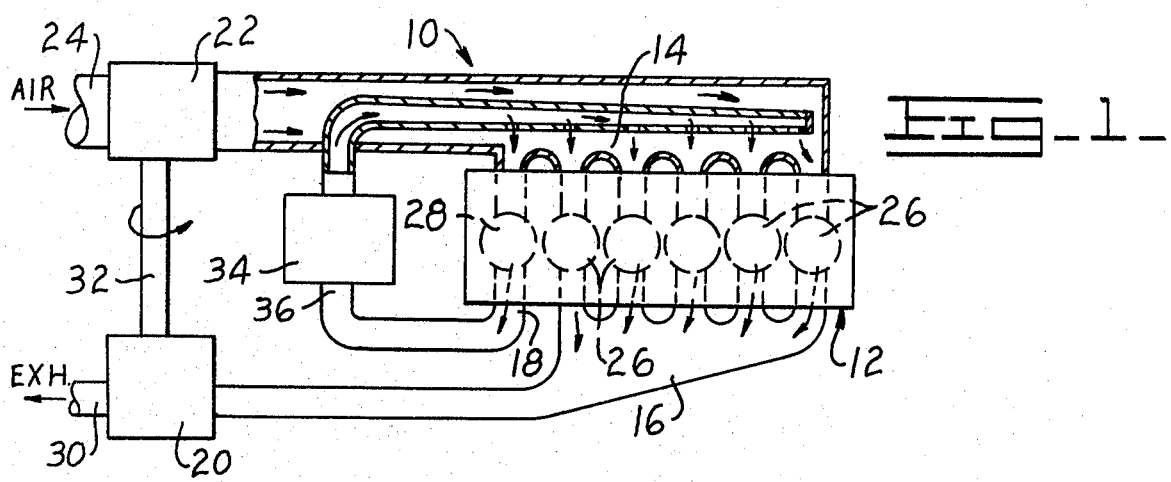
Fig_1_
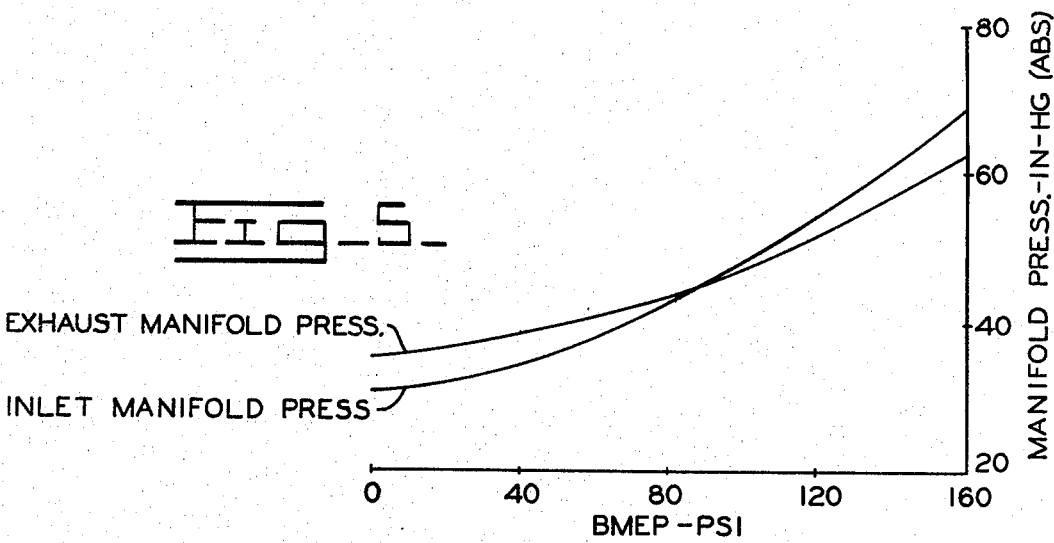
Fig_5_
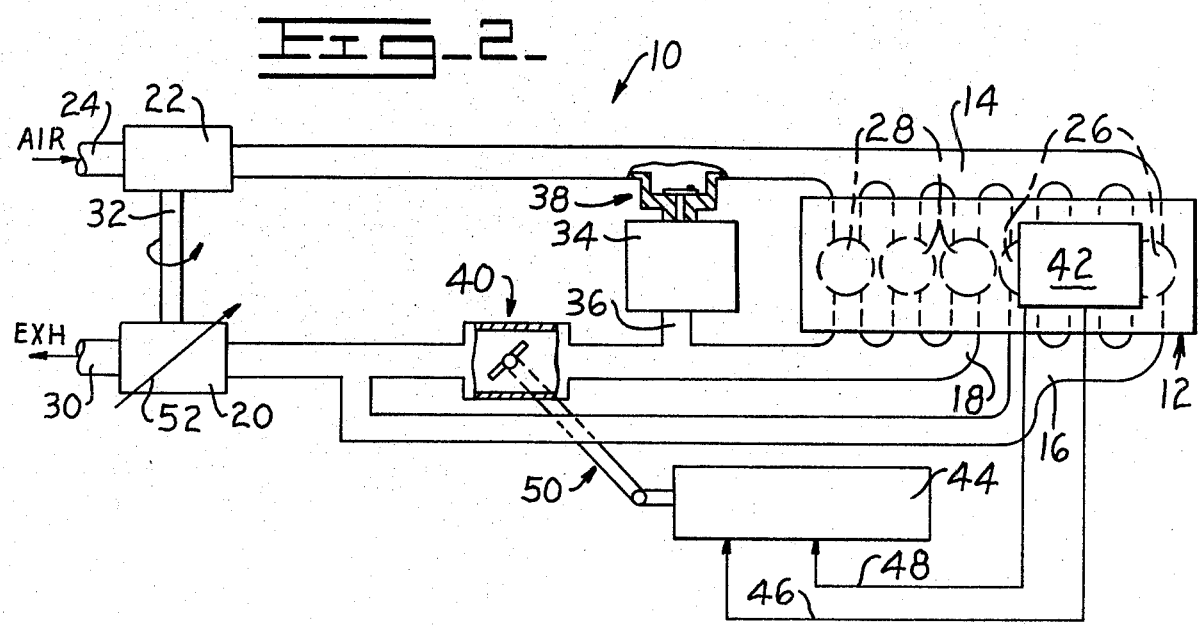
Fig_2_

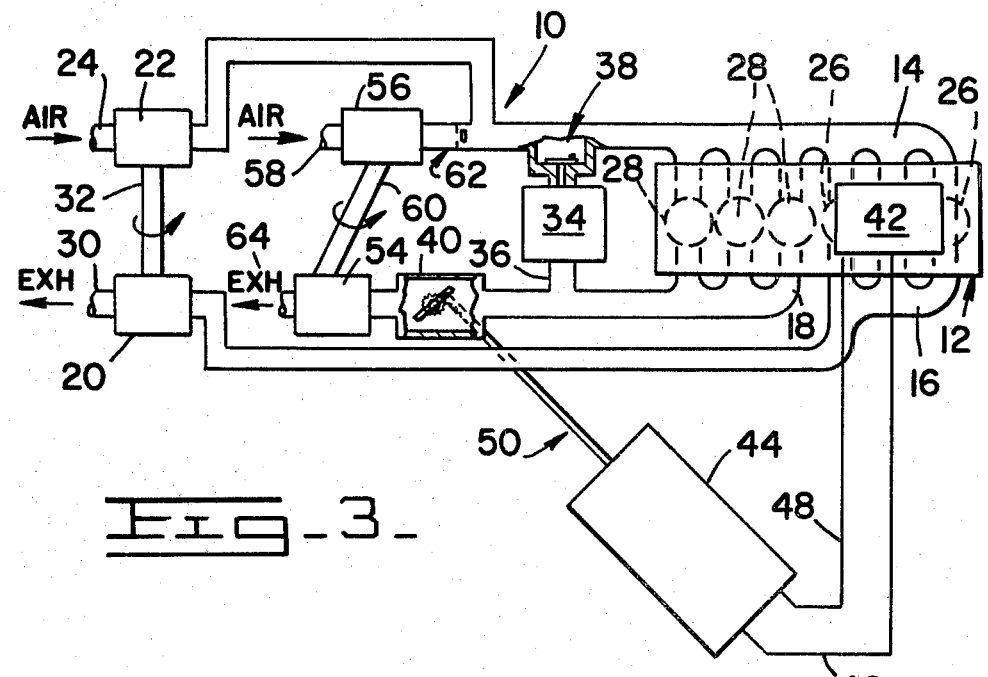
Fig_3_
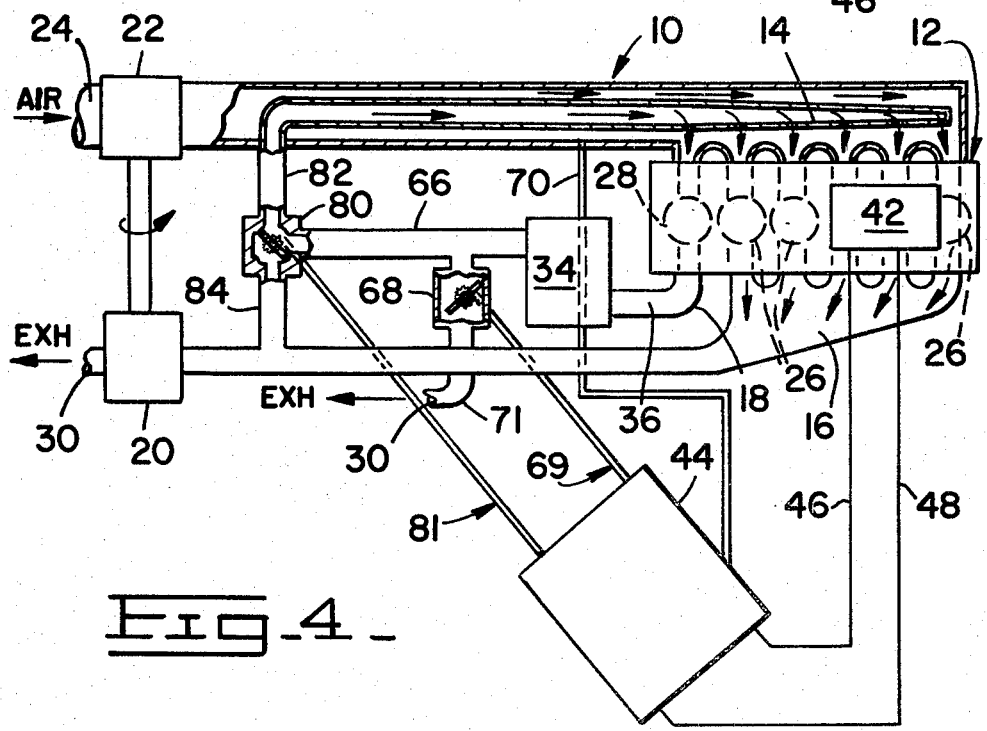
Fig_4_

EXHAUST GAS RECIRCULATION SYSTEM FOR TURBO CHARGED ENGINES

CROSS-REFERENCE

This application is a continuation-in-part of copending application Ser. No. 747,272 filed Dec. 3, 1976, now abandoned.

BACKGROUND OF THE INVENTION

1. Field of the Invention

The invention is concerned with an exhaust gas recirculating system for turbocharged engines. More particularly the invention is concerned with a unique improvement in a turbocharged engine system which makes use of a split or divided exhaust manifold whereby only a portion of the pistons of an engine driven within the respective cylinders thereof will recirculate exhaust gas into the inlet manifold.

2. Prior Art

In normal turbocharged engines the inlet manifold pressure exceeds the exhaust manifold pressure at high loads. This imposes a pumping requirement if exhaust recirculation is to be accomplished. With some types of pumps the recirculated exhaust cannot easily be metered to meet the requirements of the engine. Typical exhaust recirculation systems of the prior art are shown for example, in U.S. Pat. Nos. 3,713,428; 3,738,342; and 3,587,541. Copending and commonly assigned U.S. Patent Application Ser. No. 583,230 filed June 2, 1975, now U.S. Pat. No. 4,020,809 discloses yet another exhaust gas recirculation system for a diesel engine, particularly one in which nitrogen oxide emission is reduced.

It is clear that none of these references are in any way concerned with an exhaust gas recirculation system for a turbocharged engine wherein the system will provide pumping and metering functions for exhaust recirculation on a turbocharged engine and exhaust recirculation means piping the exhaust from only a portion of the pistons of the engine into the inlet manifold in order to reduce the production of oxides of nitrogen. Some of the advantages of such a system are that it eliminates the need for an external pump, it does not cause back pressure on more cylinders than are necessary, it can be controlled to any exhaust recirculation schedule that is required and transient performance need not be deteriorated. All of these advantages are attained by the novel improved exhaust recirculation system of the present invention in a manner which is explained in the following.

SUMMARY OF THE INVENTION

The invention is concerned with an improvement in a turbocharged engine system comprising a piston engine with inlet manifold means, exhaust manifold means, turbine means arranged to be driven by exhaust gases from said exhaust manifold means and transmit a portion of the energy from said exhaust gases to compressor means between a gas intake and said inlet manifold means. The improvement of the present invention comprises using as said exhaust manifold means a first exhaust manifold receiving exhaust gases only from a first set of one or more pistons and a second exhaust manifold receiving exhaust gases only from a second set of one or more pistons. The turbine means of the improvement of the present invention comprises a first turbine driven by exhaust gases from the first exhaust manifold. The compressor means of the improvement of the present invention comprises first compressor driven by said first turbine. The improved system of the present invention includes means for recycling a portion of the exhaust gases from the second exhaust manifold to the inlet manifold means. The system also includes means for sensing pressure in the inlet manifold means and pressure control valve means between the second exhaust manifold and the inlet manifold means. The pressure control valve means opens and closes the recycling means to exhaust in response to pressure in the inlet manifold means and stabilizes pressure in the recycling means at a value higher than pressure in the inlet manifold means.

BRIEF DESCRIPTION OF THE DRAWINGS

The invention will be better understood by reference to the figures of the drawings wherein like numbers denote like parts throughout and wherein:

FIG. 1 illustrates schematically one embodiment of the improvement of the present invention;

FIG. 2 illustrates a first alternate embodiment of the improvement of the present invention;

FIG. 3 illustrates a second alternate embodiment of the improvement of the present invention;

FIG. 4 illustrates a third alternate embodiment of the improvement of the present invention; and FIG. 5 illustrates graphically manifold pressure variations as a function of Brake Mean Effective Pressure.

DETAILED DESCRIPTION OF THE PREFERRED EMBODIMENT

Referring first to FIG. 1, there is illustrated therein a turbocharged engine system 10 in accordance with the present invention. The system 10 includes a piston type engine 12 with inlet manifold means, in the embodiment illustrated, an inlet manifold 14; exhaust manifold means, in the embodiments illustrated, a first exhaust manifold 16 and a second exhaust manifold 18; turbine means, in the embodiment illustrated a first turbine 20 arranged to be driven by exhaust gases from the exhaust manifold means, and more particularly by the first exhaust manifold 16, said first turbine 20 serving to transmit a portion of the energy from the exhaust gases to drive compressor means, in the embodiment illustrated a first compressor 22 which first compressor 22 is located between a gas intake 24 and the inlet manifold means, more particularly the inlet manifold 14.

As will be apparent from examination of FIG. 1, the first exhaust manifold 16 is connected to receive exhaust gases only from a first set of pistons 26, which set in the embodiment of FIG. 1 comprises five pistons, and the second exhaust manifold 18 is connected to receive exhaust gases only from a second set of (one) pistons 28. It is further clear that the first turbine 20 is connected between the first exhaust manifold 16 and a gas outlet 30 without constriction therebetween whereby said first turbine 20 is directly driven by exhaust gases from the first exhaust manifold 16. It is further clear that the first compressor 22 is driven as represented by a first shaft 32 by the first turbine 20.

The turbocharged engine system 10 as will be apparent by reference to FIG. 1 includes means for recycling a portion of the exhaust gases from the second exhaust manifold 18 to the inlet manifold 14. The recycling means comprises a recirculating cooler 34 in a line 36 between the second exhaust manifold 18 and the inlet manifold 14. The number of pistons in the second set of pistons 28 is chosen so as to provide a predetermined and desirable flow of exhaust gas for mixing with air entering the gas intake 24 and being introduced therefrom into the inlet manifold 14. The exhaust gas recirculated in this manner serves to suppress formation of oxides of nitrogen. Since only exhaust gas from the second set of pistons 28 is recirculated, only these pistons act against an increased back pressure and thus fuel consumption is increased only in proportion to the number of pistons subject to increased back pressure.

OPERATION

Turning once again to FIG. 1 it will be noted that air is taken into first gas intake 24 and passes via the first compressor 22 to the inlet manifold 14. Thence the air is burned with fuel in the engine 12 and exhaust gases from engine 12 exit via the first exhaust manifold 16 and the second exhaust manifold 18. The first exhaust manifold 16 accepts gases only from the first set of pistons 28 and the second exhaust manifold 18 is connected to accept gases only from the second set of pistons 26. The gases from the first exhaust manifold 16 pass without significant obstruction to the first turbine 20. Recirculation of gas from the first exhaust manifold 16 to the inlet manifold 14 is completely prevented within the system 10. Recirculation from the second exhaust manifold 18 to the inlet manifold 14 occurs as represented by line 36 and generally via the recirculating cooler 34. Thus only a portion, in the embodiment illustrated one, of the total (six) cylinders serve to recirculate exhaust gas into the inlet manifold.

FIRST ALTERNATE EMBODIMENT

Adverting to FIG. 2, there is illustrated a first alternate embodiment of the present invention which is identical to the embodiment described above but which further includes certain advantageous modifications as described in following. In particular, valve means in the FIG. 2 embodiment, a check valve 38 is included between the second exhaust manifold 18 and the inlet manifold 14 to prevent reverse flow from the inlet manifold 14 to the second exhaust manifold 18 through the recirculating cooler 34.

Intermediate the second exhaust manifold 18 and the first turbine 20 there is provided an adjustable throttle, in the embodiment of FIG. 2 a controllable butterfly valve 40 or equivalent structure. Through adjustment of the butterfly valve 40 the amount of exhaust gases recirculated from the second exhaust manifold 18 to the inlet manifold 14 and the amount of exhaust gases from the second exhaust manifold 18 which are delivered to the first turbine 20 can be controlled. The check valve 38 can be biased closed if desired in which case control of the strength of biasing of the check valve 38 determines how much pressure must be built up within the second exhaust manifold 18 in order to open the check valve 38 and allow flow from the second exhaust manifold 18 to the inlet manifold 14. Control of the butterfly valve 40 to cause said butterfly valve 40 to open and close is preferably via a governor 42 and an electronic governor control 44. The electronic governor control 44 receives signals from the governor 42 indicative of engine speed as represented by line 46 and engine load (or fuel rate) as represented by line 48. An appropriate linkage 50 leads to controlled opening and closing the butterfly valve 40 under the control of the electronic governor control 44.

The first turbine 20 preferably includes a variable area nozzle as represented schematically by the arrow 52 of a conventional nature to provide recirculation with sufficient boost throughout the various available settings of the butterfly valve 40.

OPERATION

Operation of the first alternate embodiment is the same as operation of the embodiment of FIG. 1 with the following additions.

Control of exhaust gases circulation is, in the embodiment of FIG. 2, electrical as via the electronic governor control 44 operating on signals from the governor 42. Alternatively, control can be mechanical, hydraulic, or pneumatic. The governor 42 as illustrated supplies a speed signal showing engine speed as represented by line 46 and a load signal showing engine load (or fuel rate) represented by line 48. This may be accomplished by taking signals directly from the engine by using magnetic pickups from the engine flywheel ring gear for the speed signal and/or a pressure sensor in the inlet manifold for the load signal. The check valve 38 prevents loss of boost beyond a cross over point shown in FIG. 5 wherein inlet manifold pressure and exhaust manifold pressure are plotted against Brake Mean Effective Pressure (BMEP) in psi.

SECOND ALTERNATE EMBODIMENT

Turning now to FIG. 3 there is illustrated therein a second alternate embodiment of the improvement of the present invention. Once again there is a turbocharged engine system 10 comprising a piston engine 12 with an inlet manifold 14, a first exhaust manifold 16, a second exhaust manifold 18, a first turbine 20 arranged to be driven by exhaust gases from the first exhaust manifold 16 and to transmit a portion of the energy from the exhaust gases via a first shaft 32 to a first compressor 22, which first compressor 22 is between a first gas intake 24 and the inlet manifold 14 without any significant intermediate obstruction.

The exhaust manifold means as in the first alternate embodiment of the invention (FIG. 2) comprises the first exhaust manifold 16 receiving exhaust gases only from the first set of pistons 26 and the second exhaust manifold 18 receiving exhaust gases only from the second set of pistons 28. The turbine means, in addition to the first turbine 20 driven by exhaust gases from the first exhaust manifold 16, comprises a second turbine 54 driven by exhaust gases from the second exhaust manifold 18 as delivered through the butterfly valve 40. The second turbine 54 drives a second compressor 56 which is located between a second gas intake 58 and the inlet manifold 14. Driving the second compressor 56 by the second turbine 54 proceeds as represented by a second shaft 60. An inlet check valve 62 is provided intermediate the second compressor 56 and the inlet manifold 14 to prevent backflow from the inlet manifold 14 to the second compressor 56. Exhaust from the second turbine 54 passes via a second gas outlet 64 to the surrounding atmosphere.

OPERATION

Referring again to FIG. 3 there is illustrated therein an embodiment wherein it is not useful (as in the embodiment of FIG. 2) to provide a variable area nozzle in the turbine means, i.e., in either the first turbine 20 or the second turbine 54. The use of the two turbines 20 and 54, each of which receives gases from a portion of the exhaust manifold means, the first turbine 20 receiving the gases directly from the first exhaust manifold 16 and the second turbine 54 receiving the gases via the butterfly valve 40 from the second exhaust manifold 18, basically allows the butterfly valve 40 in combination with the second turbine 54 to provide the functional equivalent of making the first turbine 20 have a variable nozzle as in the embodiment of FIG. 2. The inlet check valve 62 must be added in the embodiment shown in FIG. 3 in order to prevent reverse flow through the second compressor 56. The check valve 38 in FIG. 3 serves the same purpose as the same valve in FIG. 2.

In operation, air enters the first compressor 22 via the first gas intake 24 and passes therefrom directly to the intake manifold 14. During operation and when the second compressor 56 is being driven at a high enough speed by the second turbine 54, the inlet check valve 62 will be opened and air will also be drawn from the second gas intake 58 and introduced to the inlet manifold 14. Gas within the inlet manifold 14 in any event is introduced into the engine 12 where it is burned with an appropriate fuel thus making the first set of pistons 26 and the second set of pistons 28 reciprocate. Exhaust gases from the first set of pistons 26 passes to the first manifold 16 and exhaust gases from the second set of pistons 28 passes to the second exhaust manifold 18. The exhaust gases from the first exhaust manifold 16 pass directly via the first turbine 20 to the first gas outlet 30. The first turbine 20 in the manner previously described for the embodiment illustrated in FIG. 2 causes the first compressor 22 to operate. Exhaust gases in the second exhaust manifold 18 pass as controlled by the butterfly valve 40 or other throttle means either partially or directly via the check valve 38 to the inlet manifold 14 and generally partly to the second turbine 54 and thence to the second gas outlet 64. The second turbine 54 in the manner previously described causes the second compressor 56 to turn whereby air from the second intake 58 is compressed and forced past the inlet check valve 62 to the inlet manifold 14. Operation of the butterfly valve 40 is controlled by the linkage 50, the electronic governor control 44 (which serves to control recirculation) and the governor 42 just as with the embodiment illustrated in FIG. 2.

THIRD ALTERNATE EMBODIMENT

Referring now to FIG. 4, a third alternative embodiment of the invention is illustrated. In this embodiment the exhaust gas from the first set of pistons 26 passes directly and substantially unrestrictedly to the first turbine 20 from the first exhaust manifold 16. The exhaust gas from the second manifold 18 passes to the recirculating cooler 34 via the line 36, also as with the other embodiments of the invention. Thereafter, structure and operation vary as is described in following.

The exhaust gas from the second exhaust manifold 18, after passing through the recirculating cooler 34 passes via a conduit 66 to pressure control valve means 68 (which serves to control recirculation), for example, a butterfly valve. Pressure control valve means 68 opens and closes responsive to pressure in the inlet manifold 14 as measured via a sensing line 70 and under the control of the electronic governor control 44 via a linkage 69 and serves to stabilize pressure in conduit 66 at a slightly higher value than that in the inlet manifold 14 whereby recirculation only occurs from a controlled higher pressure in the second exhaust manifold 18 to a lower pressure in the inlet manifold 14. The excess exhaust gas passes to the gas outlet 30 via conduit 71. From the conduit 66 the exhaust gas passing therethrough proceeds to a transient valve 80 which will generally be controlled by the electronic governor control 44 via a linkage 81. The transient valve 80 is a two-position valve which allows unrestricted flow therethrough to either the inlet manifold 14 via a conduit 82 or to the first turbine 20 via a conduit 84. When the fuel-to-air ratio is overly high, the electronic governor control 44 detects this via lines 46 and 48 and cuts off recirculation and directs all flow through the transient value 80 to the first turbine 20. When the fuel-to-air ratio is proper or low, the transient valve 80 directs all flow therethrough via the conduit 82 to the inlet manifold 14.

OPERATION

Operation of the third alternate embodiment is the same as operation of the embodiment of FIG. 1 with the additional control features as provided by pressure control valve means 68 and the transient valve 80 as set out above.

As can be noted, in each of the embodiments of the present invention the fuel consumption penalty due to back pressure in the exhaust manifold means occurs on only a part of the divided exhaust manifold means. That is, in each embodiment of the invention, back pressure can only build up within the second exhaust manifold 18. Thus, the fuel consumption penalty is reduced significantly.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. In a turbocharged engine system comprising a piston - type engine with inlet manifold means, exhaust manifold means, turbine means arranged to be driven by exhaust gases from said exhaust manifold means and transmit a portion of the energy from said exhaust gases to drive compressor means between gas intake means and said inlet manifold means, an improvement wherein:

said exhaust manifold means comprises a first exhaust manifold receiving exhaust gases only from a first set of one or more pistons and a second exhaust manifold receiving exhaust gases only from a second set of one or more pistons;

said turbine means comprises a first turbine driven by exhaust gases from said first exhaus manifold;

said compressor means comprises a first compressor driven by said first turbine; and said system includes means for recycling a portion of the exhaust gases from said second exhaust manifold to said inlet means; and including means for sensing pressure in said inlet manifold means and also including, intermediate said second exhaust manifold and said inlet manifold means, pressure control valve means which open and close said recycling means to exhaust responsive to pressure in said inlet manifold means, as sensed by said pressure sensing means, for stabilizing pressure in said recycling means at a value higher than pressure in said inlet manifold means.

2. An improvement as in claim 1, wherein said second set of pistons includes a sufficient number of pistons to assure that flow substantiallyl always proceeds from said second exhaust manifold towards said inlet manifold means.

3. An improvement as in claim 1, including cooling means in said recycling means intermediate said second exhaust manifold and said inlet manifold means.

4. An improvement as in claim 1, including a transient valve arranged to receive flow from said recycling means and deliver said flow to said first turbine when said engine is operating at a selective high fuel-to-air ratio and to deliver said flow to said inlet manifold means when said fuel-to-air ratio is proper or low.

* * * * *